United States Patent
Ko

(10) Patent No.: US 6,409,284 B1
(45) Date of Patent: Jun. 25, 2002

(54) CONNECTING STRUCTURE OF A WHEEL OF A GOLF CARRIER

(76) Inventor: Chin Sung Ko, No. 38, Din Nan Road, Ho Mei, Changhau (TW)

( * ) Notice: Subject to any disclaimer, the term of this patent is extended or adjusted under 35 U.S.C. 154(b) by 0 days.

(21) Appl. No.: 09/887,356

(22) Filed: Jun. 25, 2001

(51) Int. Cl.[7] ............................................. B60B 23/00
(52) U.S. Cl. ............................ 301/111.06; 301/111.01
(58) Field of Search .................. 301/111.01, 111.04, 301/111.06, 112, 115, 116, 117, 122; 280/652, 654, DIG. 6

(56) References Cited

U.S. PATENT DOCUMENTS

| | | | |
|---|---|---|---|
| 5,171,068 A | * 12/1992 | Wu | 301/111.06 |
| 5,188,430 A | * 2/1993 | Chiu | 301/111.06 |
| 5,352,026 A | * 10/1994 | Snook | 301/111.01 |
| 5,507,566 A | * 4/1996 | Chen | 301/111.06 |
| 5,891,115 A | * 4/1999 | Hauer et al. | 301/111.01 |
| 5,957,543 A | * 9/1999 | Wu | 301/111.06 |
| 6,120,106 A | * 9/2000 | Liao | 301/111.06 |
| 6,149,245 A | * 11/2000 | Wu | 301/111.06 |

* cited by examiner

*Primary Examiner*—S. Joseph Morano
*Assistant Examiner*—Long Bao Nguyen
(74) *Attorney, Agent, or Firm*—Rosenberg, Klein & Lee

(57) ABSTRACT

This invention relates to a connecting structure of a wheel of a golf carrier, which is provided with a receiver on a connecting link to engage with a connecting protrusion of a shaft of the wheel by using a bolt. The connection of the receiver and the connecting protrusion of the shaft of the wheel provides a strong strength to bear pressure when the golf carrier is used. The engagement by the bolt also provides a firm effective connection and prevents the wheel from being broken or released.

1 Claim, 5 Drawing Sheets

CONNECTING STRUCTURE OF A WHEEL OF A GOLF CARRIER

BACKGROUND OF THE INVENTION

A conventional golf carrier, as shown in FIG. 1, includes a pair of connecting links (1), each of which is directly connected with an inner end of a shaft (21) of a wheel (2). This single connecting structure will suffer a strong pressure on the shaft (21) when in use. So the shaft (21) will be damaged easily and the wheel (2) may not be rolled normally. The golf carrier is then unfacilitated in use.

The primary object of the invention is to provide a connecting structure of a wheel of a golf carrier, which provides a receiver at an outer end of the connecting link to engage with a connecting portion formed on an inner end of a shaft of the wheel. The connecting structure provides an effective connection and improves connecting strength for bearing pressure safely. Now the features and advantages of the invention will be described in detail with reference to the accompanying drawings.

BRIEF DESCRIPTION OF THE INVENTION

DETAILED DESCRIPTION OF THE INVENTION

Figure 1:
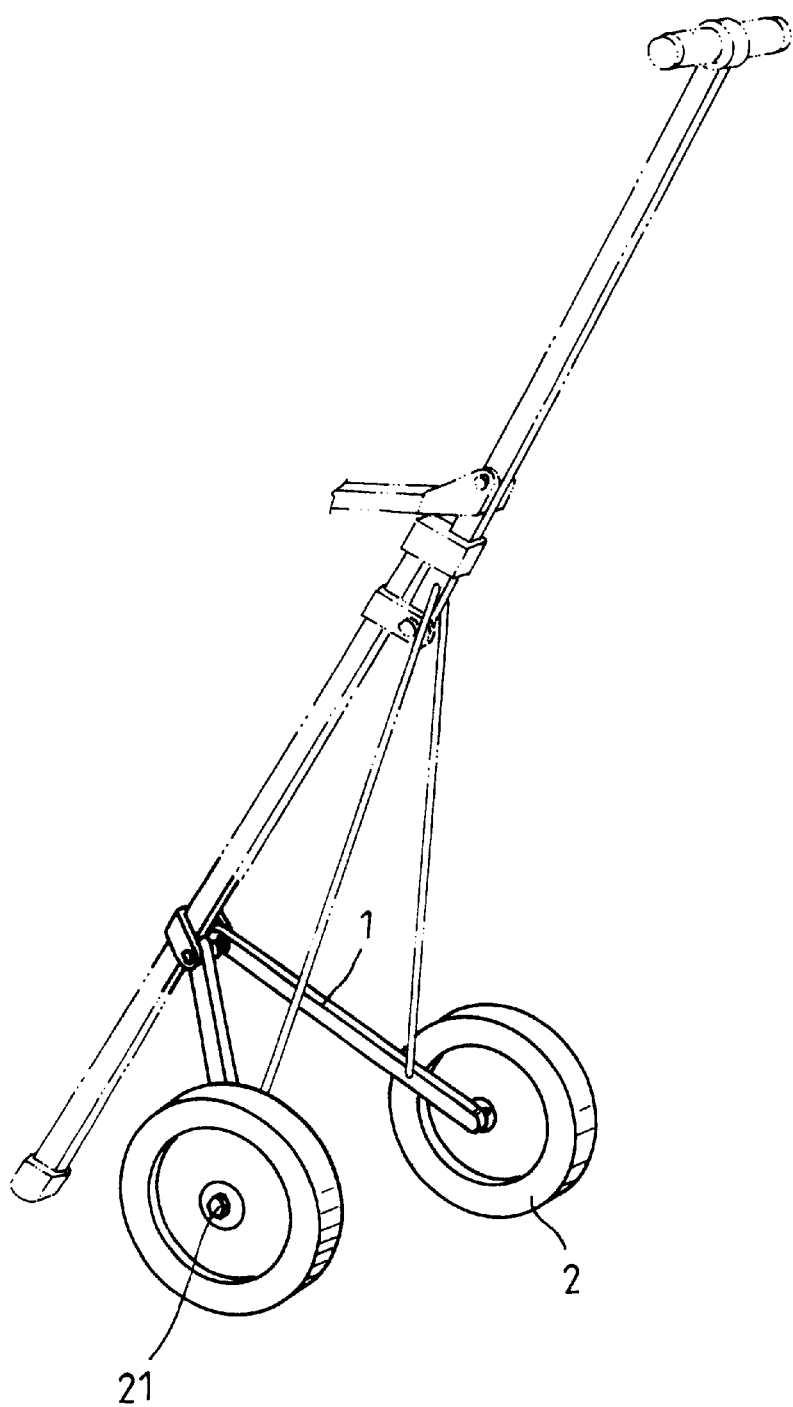
FIG. 1 is a schematic perspective view showing a prior golf carrier.
Figure 2:
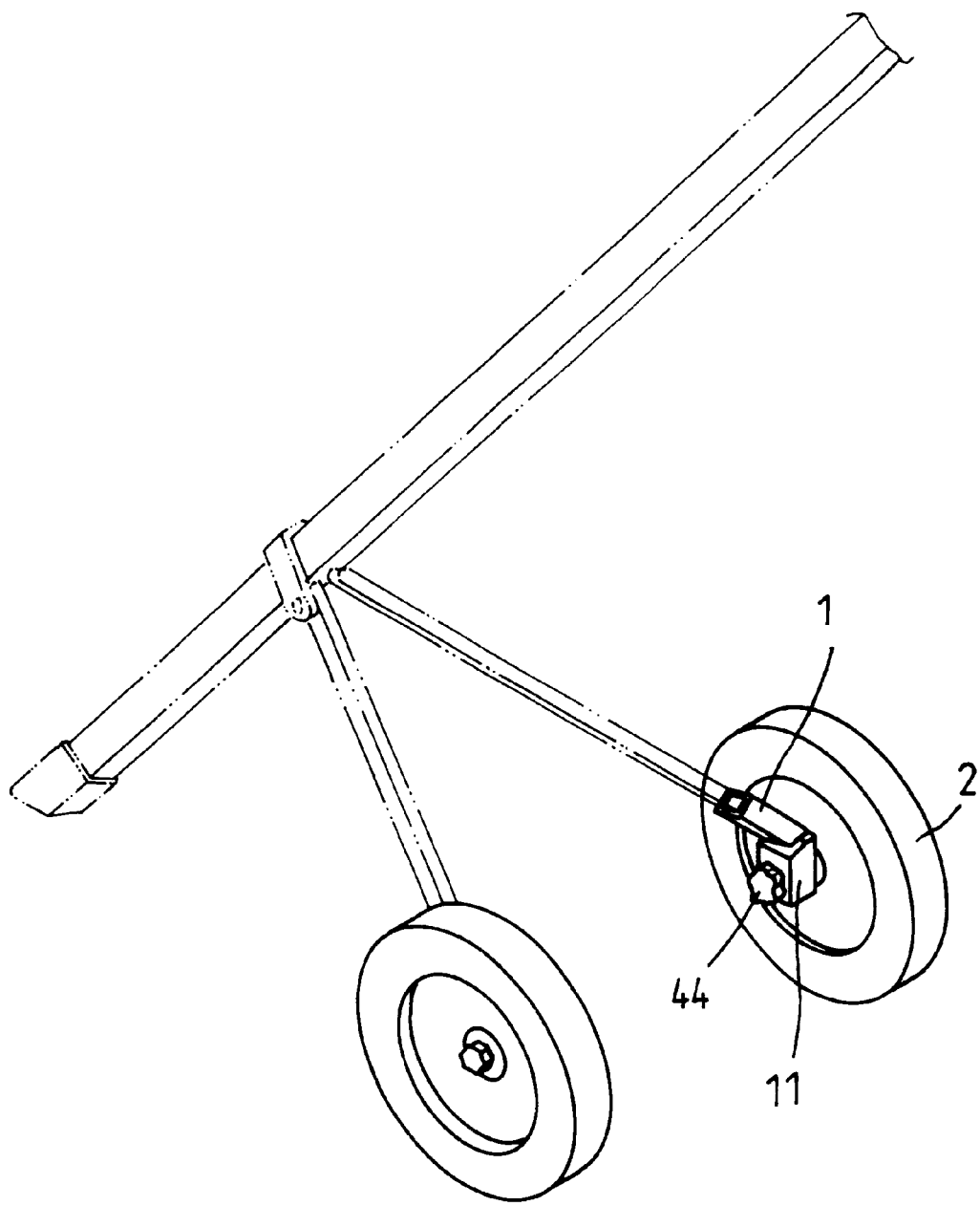
FIG. 2 is a schematic perspective view showing a part of a golf carrier according to the present invention.
Figure 3:
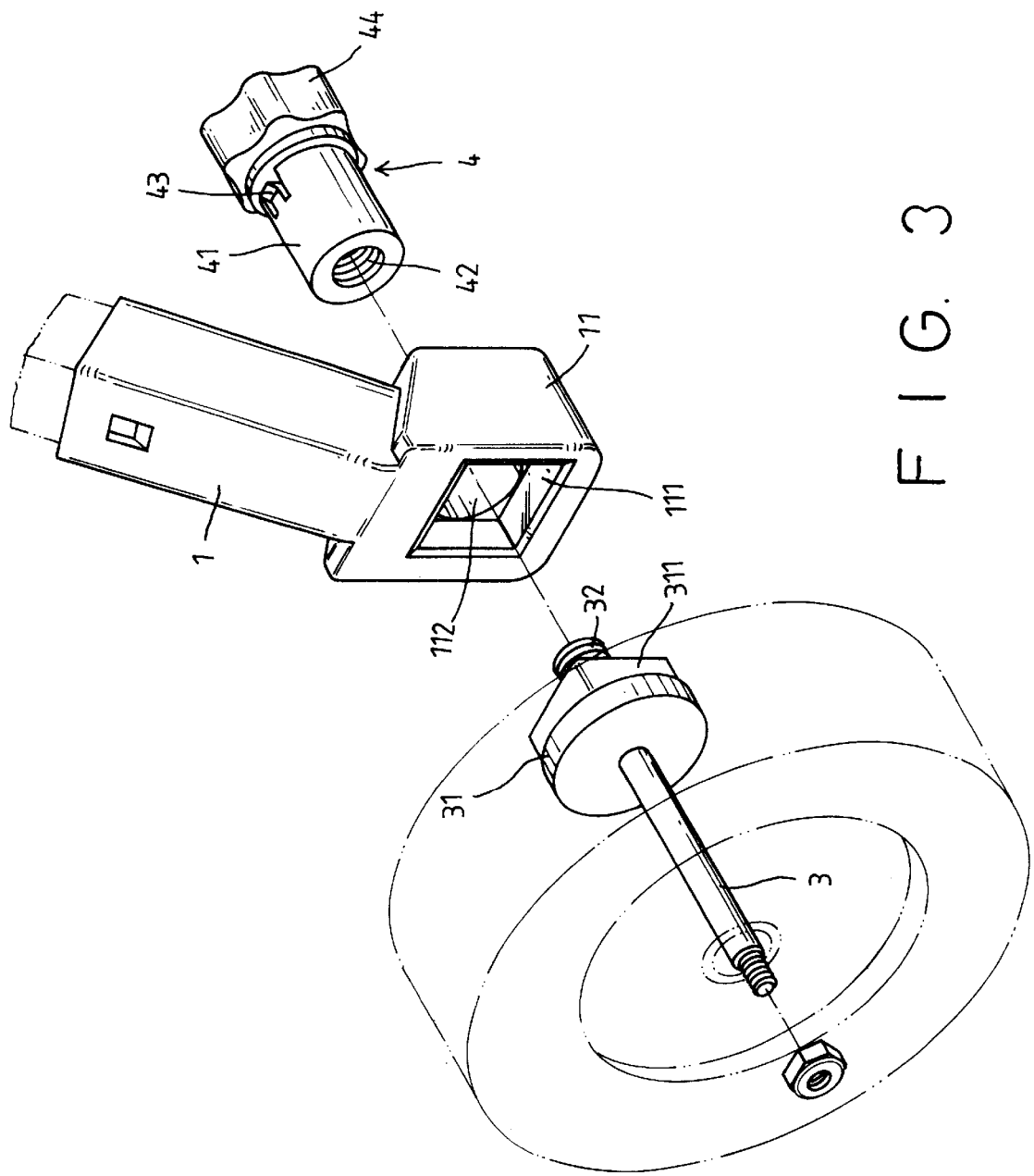
FIG. 3 is an exploded perspective view showing a part of a golf carrier of FIG. 2.
Figure 4:
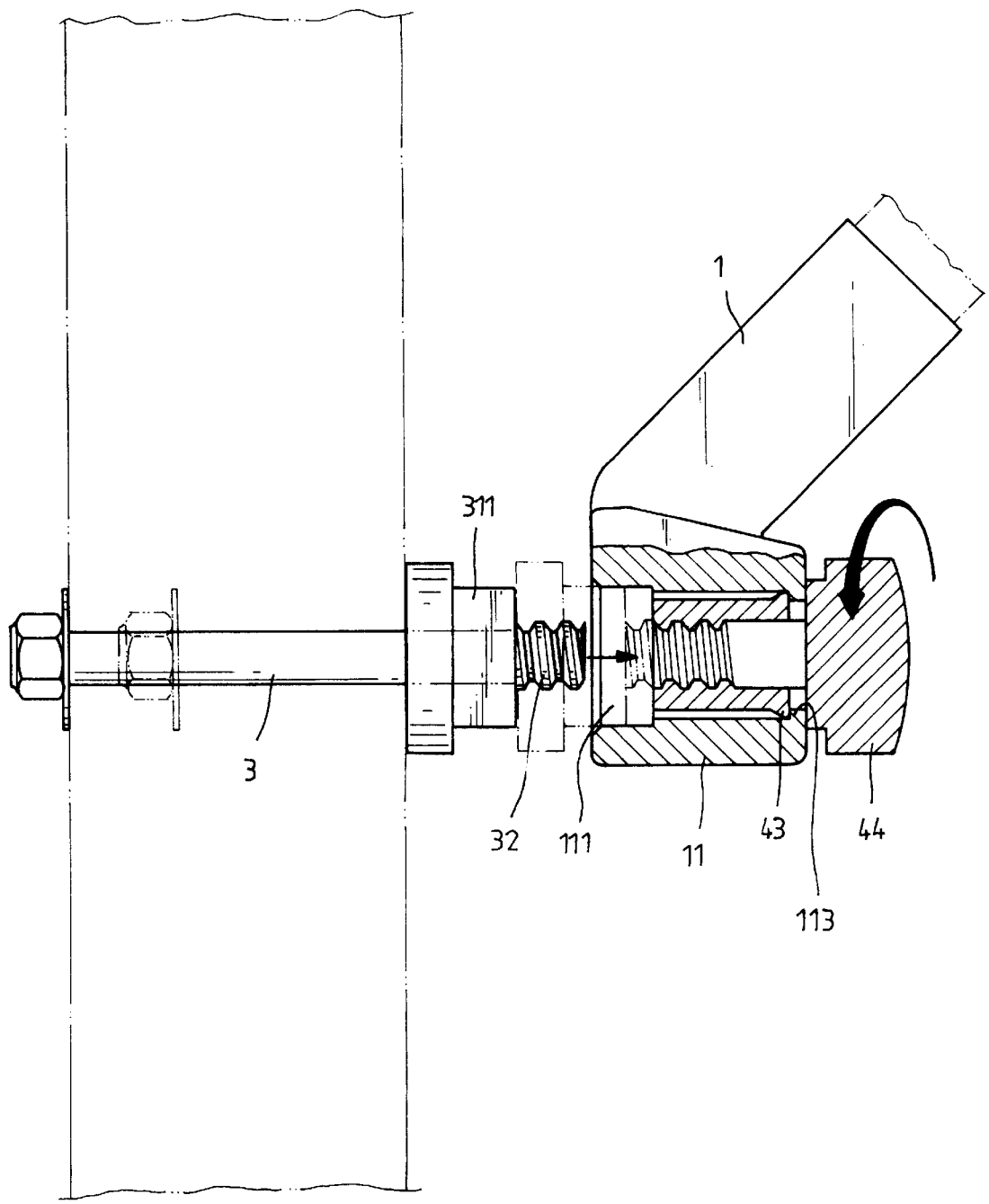
FIG. 4 is a cross-sectional plan view showing a part of a golf carrier according to the present invention.
Figure 5:
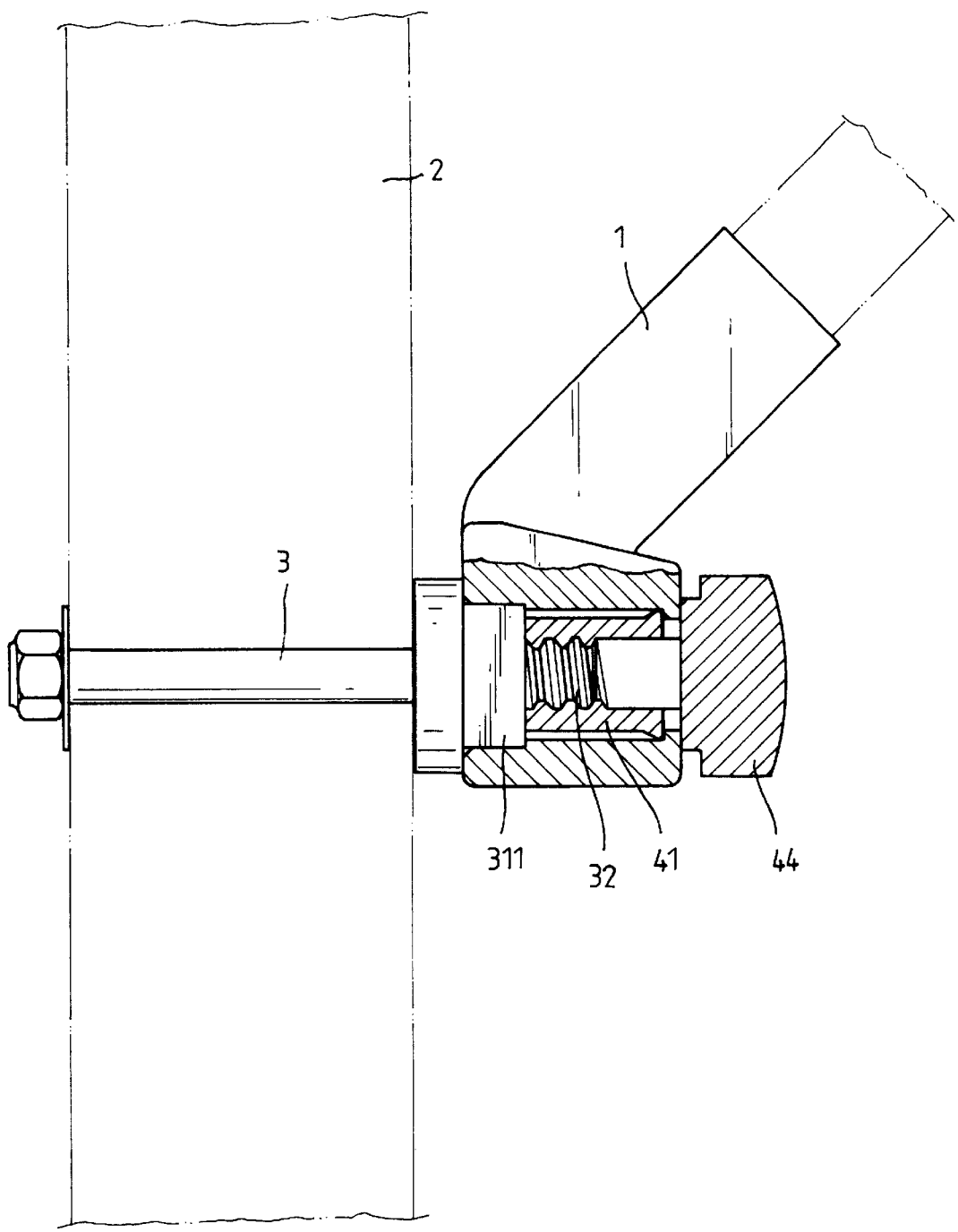
FIG. 5 is an assembled cross-sectional plan view of FIG. 4.

Please refer to FIGS. 2 to 4, the present invention relates to an improvement on a connecting structure between a wheel (2) and a connecting link (1) of a golf carrier. The connecting link (1) is provided with an end receiver (11), which has a rectangular groove (111) at one side, a neck (113) at the other side, and an inner circular hole (112). A shaft (3) of the wheel (2) is provided with an inner connecting portion (31), which has a rectangular protrusion (311) for adapting the groove (111) of the receiver (11) to obtain a firm engagement. An outward thread end (32) will be extended into the circular hole (112). A fixing bolt (4) is provided to insert into the neck (113) to engage an inner bolt hole (42) of a bolt rod (41) of the bolt (4) with the thread end (32). While a bolt head (44) of the bolt (4) is rotated, the receiver (11) and the shaft (3) will be connected firmly. Meanwhile, an elastic flange (43) is formed on the bolt rod (41) and when the flange (43) passes through the neck (113) of the receiver (11), the bolt (4) will be securely engaged with the receiver (11) and never be loosened or released from the receiver (11) that overcomes the drawback of a prior art.

Accordingly, the present invention obviously provides a better connecting strength between the shaft of the wheel and the connecting link. And the wheel of the golf carrier will be facilitated in use and prevented from broken or released. Evidently it meets the requirements of granting a patent. We hereby file an application for a patent grant.

What is claimed is:

1. A connecting structure of a wheel of a golf carrier relating to a connecting structure between a wheel and a connecting link of a golf carrier, wherein the connecting link being provided with an end receiver which has a rectangular groove at one side, a neck at the other side, and an inner circular hole, and a shaft of the wheel being provided with an inner connecting portion which has a rectangular protrusion for adapting the groove of the receiver to obtain a firm engagement, and an outward thread end being extended into the circular hole; a fixing bolt being provided to insert into the neck to engage an inner bolt hole of a bolt rod of the bolt with the thread. end, and while a bolt head of the bolt is rotated, the receiver and the shaft being connected firmly; and an elastic flange being formed on the bolt rod and when the flange passes through the neck of the receiver, the bolt being securely engaged with the receiver and never being loosened or released from the receiver.

* * * * *